United States Patent [19]

Katzeff et al.

[11] Patent Number: 4,577,061

[45] Date of Patent: Mar. 18, 1986

[54] ARRANGEMENT FOR A PAY TELEPHONE PAYMENT SYSTEM UTILIZING A PAYMENT CARD WITHIN THE TELECOMMUNICATION SYSTEM

[76] Inventors: Kurt Katzeff; Tommy Petre, both of Televerkets Huvudkontor, Fack, S-123 86 Farsta, Sweden

[21] Appl. No.: 609,077

[22] PCT Filed: Sep. 5, 1983

[86] PCT No.: PCT/SE83/00311

§ 371 Date: May 7, 1984

§ 102(e) Date: May 7, 1984

[87] PCT Pub. No.: WO84/01073

PCT Pub. Date: Mar. 15, 1984

[30] Foreign Application Priority Data

Sep. 7, 1982 [SE] Sweden .............................. 8205066

[51] Int. Cl.$^4$ ...................... G07F 17/24; H04M 17/02
[52] U.S. Cl. ........................... 179/2 AM; 340/825.33; 340/825.35; 179/6.3 CC
[58] Field of Search ............. 179/2 AM, 6.3 CC, 2 A, 179/2 CA, 6.4, 2 R; 340/825.31, 825.33, 825.34, 825.35

[56] References Cited

FOREIGN PATENT DOCUMENTS

| | | |
|---|---|---|
| 0041261 | 12/1981 | European Pat. Off. . |
| 2803654 | 8/1979 | Fed. Rep. of Germany . |
| 2286565 | 4/1976 | France . |
| 2339215 | 8/1977 | France . |
| 2027965 | 2/1980 | United Kingdom . |
| 2065353 | 6/1981 | United Kingdom . |

OTHER PUBLICATIONS

B. Midland, IBM Technical Bulletin, 2-1971, "Computerized Meter Reading System", vol. 13, No. 9, pp. 2682-2683.

Primary Examiner—James L. Dwyer
Attorney, Agent, or Firm—Pollock, Vande Sande & Priddy

[57] ABSTRACT

A payment system utilizing a payment card (5) is employed for a telephone set (1) which forms part of the general telephone network and is connected to a telephone central office (2) via a subscriber's line (3). The telephone set and the telephone central office are provided with first devices which exchange first signals via the subscriber's line. The first devices include first subsidiary devices for identification of the payment card (5) concerned, second subsidiary devices for sensing of the residual value (5a) on the card, and third subsidiary devices for erasure and possible indication of the residual value on the card after this has been used for calls subject to a charge. The payment system also serves an installation separate from the telephone system, which can comprise an automatic parking installation. The letter includes a parking meter (14) and this and the telephone central office are provided with second devices which exchange second signals via the subscriber's line (3). Essentially the second devices correspond, as regards their function, to the first devices. The telephone call and communication signals together with the first and second signals are separated by means of filter devices (11, 11', 13, 13', 16, 16') which are or can be connected to the subscriber's line.

3 Claims, 3 Drawing Figures

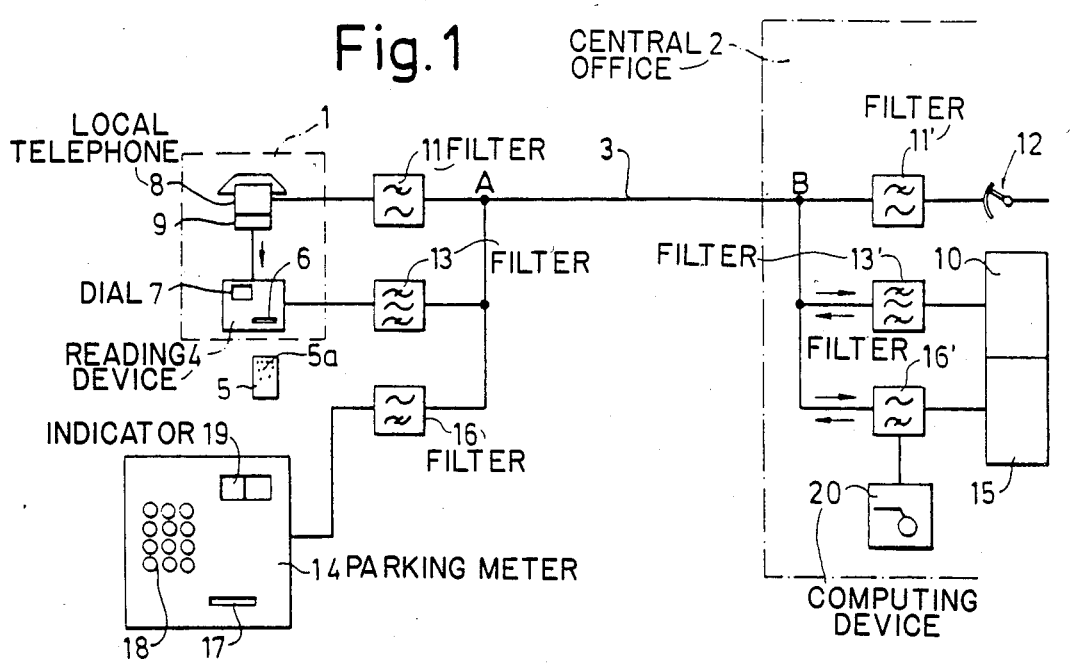
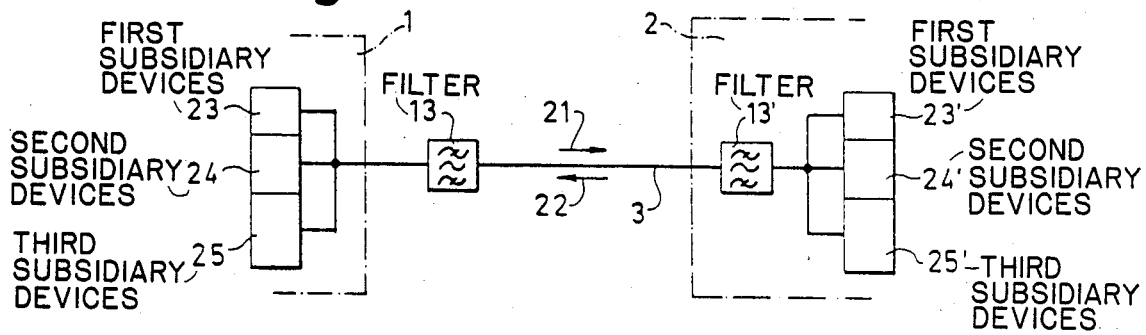
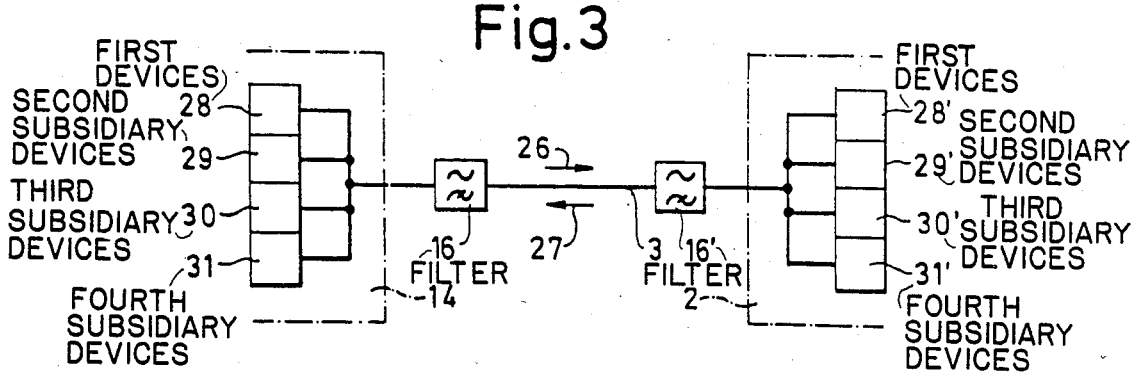

ARRANGEMENT FOR A PAY TELEPHONE PAYMENT SYSTEM UTILIZING A PAYMENT CARD WITHIN THE TELECOMMUNICATION SYSTEM

TECHNICAL FIELD

The present invention relates to an arrangement for a payment system utilising a payment card for a telephone set connected to the general telephone network by a connection such as a subscribers' line, which can be connected to a telecommunication central office. In such a payment system, the telephone set and the telecommunication central office are provided with first devices exchanging first signals along the line. First subsidiary devices for identification of the payment card involved, second subsidiary devices for sensing the residual value, e.g. the number of markings, on the card, and third subsidiary devices for erasure and possible indication of the residual value on the card after each use subject to a charge are provided.

STATE OF THE ART

A method for payment is already known for utilising payment systems on telephone sets which are installed at public places, known as coinbox sets. Such apparatus has in the past been equipped so that it can be operated by means of coins of different values. However, current requirements for simplification in coin-handling have led to the development of payment systems which utilise payment cards, which can be introduced into a reader system which is arranged on or near the telephone set. The payment card can be so designed that, for calls to made, it is provided with a number of value markings which, when the card is utilised in the set, are gradually erased depending on the number of calls debited. When all the value markings on the card have been erased, the card can no longer be used, and instead the owner has to procure a new payment card.

Apart from card-reading equipment on or near the set, the equipment hitherto known for the payment system can comprise indicating devices which before and/or after use indicate the remaining value markings on the card so that the user can obtain information regarding the number of residual value markings. The payment is also presumed to be designed in such a way that the last value marking on the card is utilised while a call is in progress, and if further value markings are required, the call is interrupted.

DESCRIPTION OF THE INVENTION

1. Technical Problem

The introduction of a payment system of this type for existing general telephone set in an area can prove to be relatively expensive for the telephone administration concerned. As a rule the number of coin boxes in an area is relatively small and the sale of payment cards can hence be relatively expensive so it is often not justifiable to introduce payment systems with payment cards, in spite of the obvious advantages wich such a system offers to subscribers.

2. Solutions

The main object of the present invention is to solve the problem outlined above. The main feature of the new invention is that the payment system also serves to fulfil a function completely distinct from the telephone network such as operating an automatic parking installation. A unit which can be enabled by the payment card such as a parking meter. The unit and the telephone centre (exchange) are provided with second devices which exchange second signals via the line, with a function which at least essentially corresponds to that of the first device. First second and third filter devices are provided at the telephone set/unit and at the telephone centre for separation of the telephone network communication signals from the first and second signals.

A first further embodiment of the inventive concept concerns the case where the installation separate from the telephone net work comprises an automatic parking installation. In this case the user of the parking meter concerned should be capable of specifying, e.g. on a keyboard or corresponding actuating devices which can be operated manually, for how long a period the parking place is to be utilised.

The further embodiments also relate to how the computer devices, for computer-recording to the billing charges, are to be arranged at the telephone central office so as to facilitate calculations of the amount of the total revenue from the telephone sets and parking meters wich are to be allocated to the automatic parking installation.

3. Advantages

The major advantages obtained from the proposed invention is that the payment system can be based on a broader foundation from both the technical and economic viewpoints. The payment system can be more advanced in design to prevent unauthorised manipulations of the equipment and the associated payment cards. The integration between the telecommunication network and the installation connected in parallel therewith can be made more advanced, and the more delicate equipment, as regards manipulation, can be located in the telephone central office to make it difficult to tamper with the payment system.

Because the payment system and various portions of the telephone equipment and the automatic parking facilities are compatible, it is easy for the same payment card to be utilised for both telephoning and parking etc. Communication between the user and the system is by the keyboard on the telephone set utilised during telephoning. It is assumed that a corresponding keyboard is provided on the respective parking meters or the corresponding unit, so the user will be able to employ the payment card for the parking charge. Conversion of the value markings on the payment card for telephoning can be easily undertaken in existing types of conversion equipment in the payment system.

Particular advantages are obtained if the installation concerned is connected to a subscriber's line for a public telephone receiver, since by this means the subscriber's line for the telephone receiver can automatically be employed. Hence no special lines need to be provided for the parking equipment, but instead of this can be easily connected to the subscriber's line for the nearest telephone set.

DESCRIPTION OF DIAGRAMS

One embodiment proposed is an arrangement which exhibits the features characteristic of the invention and which will be described in the following text with simulaneous reference to the appended drawings where:

FIG. 1 shows, in schematic form, a payment system utilising equipment for telephone sets and an installation separate from the function of the telecommunication in the form of an automatic parking installation.

FIG. 2 shows, in schematic form, first devices forming part of the installation in accordance with FIG. 1, which exchange first signals via a subscriber's line, and FIG. 3 shows, in schematic form, second devices forming part of the installation shown in FIG. 1, which exchange second signals via the subscriber's line.

PREFERRED MODE OF CARRYING OUT THE INVENTION

In FIG. 1 a telephone set installed in a public place indicated by 1. The set is of the type installed in telephone booths and at similar locations. A number of such devices are connected in a known manner to a telephone central office 2, each via its own subscriber's line 3 or corresponding line. The telephone set is furthermore of the type which comprises a reading device 4 for payment cards 5. The payment card can be designed in a known manner and comprise a number of value markings 5a. The card can be inserted into a slot or groove 6 of the reading device. The reading device 4 can sense the number of value markings 5a on the payment card, and after proper identification of the card, will inform the user regarding the number of remaining markings on the card. The reading equipment 4 can be provided with an indicating device 7 on which up-to-date information can be presented to the user. The telephone set 1 comprises a conventional telephone set 8 and pulse arrangements 9, e.g. in the form of a keyboard, dial or the like. The keyboard 9 or the like can also be employed for transmitting the desired information from the user to the payments system, which information can for example consist of the required maximum length of the telephone call which has been initiated by the card.

The telephone central office 2 comprises devices 10 which interact with the reading device 4. The devices 4 and 10 exchange signals, here designated as first signals, via the subscriber's line 3.

The channel obtained by the subscriber's line 3 is sub-divided, by means of filters, into speech communication signals in the telephone network and the first signals in the payment system. Thus initial filters 11, 11' which ensure the passage of the speech and communication signals between the telephone device 8 and the telephone network system 12 are arranged in conjunction with the line, the telephone set and also the telephone central office. The speech and communication channels comprise a large number of the available communication channels and cover the range between 0 and 5 kHz. A range in the subscriber's line channel, e.g. between 9 and 15 kHz, is provided for the first signals, which range is sub-divided by means of second filter devices 13, 13'. At the telephone set 1, an interconnection point A is provided between the outputs of the filters 11 and 13 and at the end of the subscriber's line concerned. The first filter 11 is connected between the telephone device 8 and point A, whilst the second filter 13 is connected between the reading device 4 and the interconnection point A. There is a corresponding interconnection point B at the telephone central office, to which interconnection point B the second end of the subscriber's line is connected, and also the output of the first and second filters 11' and 13' respectively. Thus the first filter 11' is connected between the interconnection point B and the selector equipment 12, while the second filter 13' is connected between the interconnection B and the device 10.

In accordance with the inventive concept, an installation which is entirely separate from the telephone system is functionally connected thereto in such a way that the payment system as described above can be intergrated with corresponding payment system in the installation. As an example of an installation, an automatic parking installation may be mentioned which comprises a number of parking meters or corresponding units, one of which is indicated by 14 in FIG. 1. This unit interacts with corresponding devices 15 at the telephone centre, and the units 14 and devices 15 exchange second signals via the same subscriber's line 3 in which a further signal channel is allocated to the second signals. The further channel is provided by means of third filters 16, 16'. The second signals can have a frequency of 15 kHz or upwards, e.g. 16 kHz. The third filters 16 are here connected between the interconnection points A and the units 14, whilst the filter 16' is connected in between the interconnection point B and the devices 15.

The unit 14 is provided with a reading unit corresponding to the device 4 utilised in apparatus 1. The reading device in unit 14 is indicated by the insertion slot 17 of the payment card 5. The reading devices 4 and 17 are compatible and thus can accept and be initiated by the same card 5. The unit 14 also indicated by the insertion slot 17 of the payment card 5. The reading devices 4 and 17 are compatible and thus can accept and be initiated by the same card 5. The unit 14 also includes a keyboard 18 or corresponding manual devices by means of which the user can feed information into the system, e.g. regarding the length of the parking time required. The unit 14 can be provided with indication devices 19 which can show the time expires, and/or indicate to the user how many value markings remain on the card before and/or after use.

At the telephone centre, computing devices 20 are also provided which can be connected, e.g. via the third filter 16'. By means of the said computing devices, it is possible to ascertain the use of the automatic parking installation to determine what portion of the total revenues from the telephone and parking functions is to be allocated to the parking function.

FIG. 2 shows an example of the construction of the first device which exchanges the first signals 21 and 22 via the subscriber's line 3. Thus, the first subsidiary devices 23, 23' can be respective sides as to identify the payment card 5 involved. Second subsidiary devices 24, 24' are also provided on both sides so as to sense the residual value on the card and possibly to convert the value markings on the card to the number of telephone call markings. The second subsidiary devices 24, 24' can, in a preferred embodiment, include indication devices which show the user how many call markings he still has on the card. The first device also includes the third subsidiary device 25, 25' for erasing the markings to be erased for the call which has just been made. The third subsidiary device 25, 25' can here interact with the indication device so as to indicate the residual value on the card after the call has been made.

The unit 14 and devices 15 have second devices which correspond at least essentially to the first devices described above. The second devices are shown schematically in FIG. 3 where second signals which are exchanged between the devices are denoted by 26 and 27. The second devices thus comprise first devices 28, 28' for identification of the payment card involved. Second subsidiary devices 29, 29' are employed for sensing the residual value on the card, whereby the residual value can be automatically converted to time units, e.g. minutes or hours, which are still available for parking at the place concerned. The equipment can deal with the different rates which, as is the case with telephoning, can be imposed at different parking points. The subsidiary devices 29, 29' can include or are interconnected with indication devices which show the residual value. The third subsidiary devices 30, 30' erase the value markings on the card as a function of the charge which is made for parking. The second devices are furthermore provided with fourth subsidiary devices 31, 31' which enable a user of a parking place, by means of the manual actuating devices 18, to determine in advance the time which he/she desires to use up. The fourth subsidiary device can comprise or be connected to indication devices 19 which show the time selected for parking and/or the expiration of the time involved.

The procedure employed for using the equipment described above with the aid of a payment card can differ, depending on the design and function of the equipment. Details will be given here to two examples of its use. In the first example, the process starts with a user feeding the card into the card reader, e.g. the parking meter. The second device in the unit 14 reads the card and transmits a second signal in the form of a call-up signal is received and this transmits the current marking value by means of a second signal, similary at 16 kHz. The unit 14 indicates the value on the card, e.g. in hours and/or minutes. Depending on the time indicated, the user indicates the time required for parking by means of keyboard 18. Then the unit erases the corresponding number of markings and indicates the end of the parking period on the parking meter. The meter can be an individual one for the parking place or common to a number of parking places. It is possible for the card or counterfoil to be stamped. The unit then feeds out the card and transmits signals to the centre by means of further second signals in the form of 16 kHz pulses regarding the number of markings erased. The number of markings is recorded at the telephone centre on the counter 20.

In the second method for employing the parking installation, the procedure starts with a user feeding in this payment card. Unit 14 reads the card and transmits a call-up signal at 16 kHz. In addition, the number of markings on the card is transmitted. Depending on such second signals received, the telephone centre calculates the parking time available, after which the time information is transmitted back to the unit 14. Depending on the time information, the unit indicates the time available in, e.g., hours and/or minutes. In this case also, the user must indicate the time required by means of the keyboard, and the unit receives signals regarding this and re-transmits the time required on the 16 kHz band to the telephone centre. As a result the last mentioned signals which are received, the telephone centre transmits the number of markings which are to be erased, and at the same time the transaction is recorded on the telephone centre counters. The unit 14 undertakes erasure of the marking involved. At the same time, the termination of the parking period is indicated on the meter concerned, and stamping of the card or counterfoil can take place. Finally the card is ejected. Alternatively, registration of the transaction on the counting device 20 can take place after the card has been ejected.

The equipment described above is constructed on the basis of known technology. It is assumed that the functions of the first device for using the payment card are known and hence do not need to be described here.

The invention is not restricted to the embodiments described above by way of examples but can be subjected to modification within the scope of the patent claims which follow.

We claim:

1. A payment system for a public telephone service and an auxiliary public service unrelated to said telephone service comprising:
    a remote telephone facility adapted to be connected by a subscriber line to a telephone network central office, said remote telephone facility including:
        a public telephone service facility offering telephone service in exchange or payment via a payment card comprising;
        a reading device means for reading and debiting a payment card, said reading device connected to said telephone network;
        a first set of telephone subsidiary devices for interfacing said reading device via said subscriber line and a central computer to said telephone network, whereby information may be transferred between said payment card and central computer identifying the identity of the payment card;
        a second set of telephone subsidiary devices for interfacing said reading device via said subscriber line to communicate the residual value of the payment card to the computer facility;
        a third set of telephone subsidiary devices for communicating the erasure of information on said payment card to said readng device, whereby said payment card can be debited;
    an auxiliary public service facility offering services in exchange for payment via a payment card comprising:
    an auxiliary reading device for reading and debiting a payment card which is issued for subscribing to said service;
    first, second and third auxiliary devices for interconnecting said auxiliary reading device via said subscriber line to said central computer and transmitting the identity of an auxiliary payment card, residual value of said card and erasure information for said card;
    said auxiliary devices and telephone devices including filter means for maintaining signals destined for said telephone facility and auxiliary facility separate from each other.

2. The payment system of claim 1 wherein said auxiliary public service facility further includes means to indicate the residual value of a payment card received by said auxiliary public service facility reading device.

3. The payment system of claim 1 wherein said computer facility includes a computer for counting the number of payment cards and value of payments received from said payment cards.

* * * * *